United States Patent Office 3,179,778
Patented Apr. 20, 1965

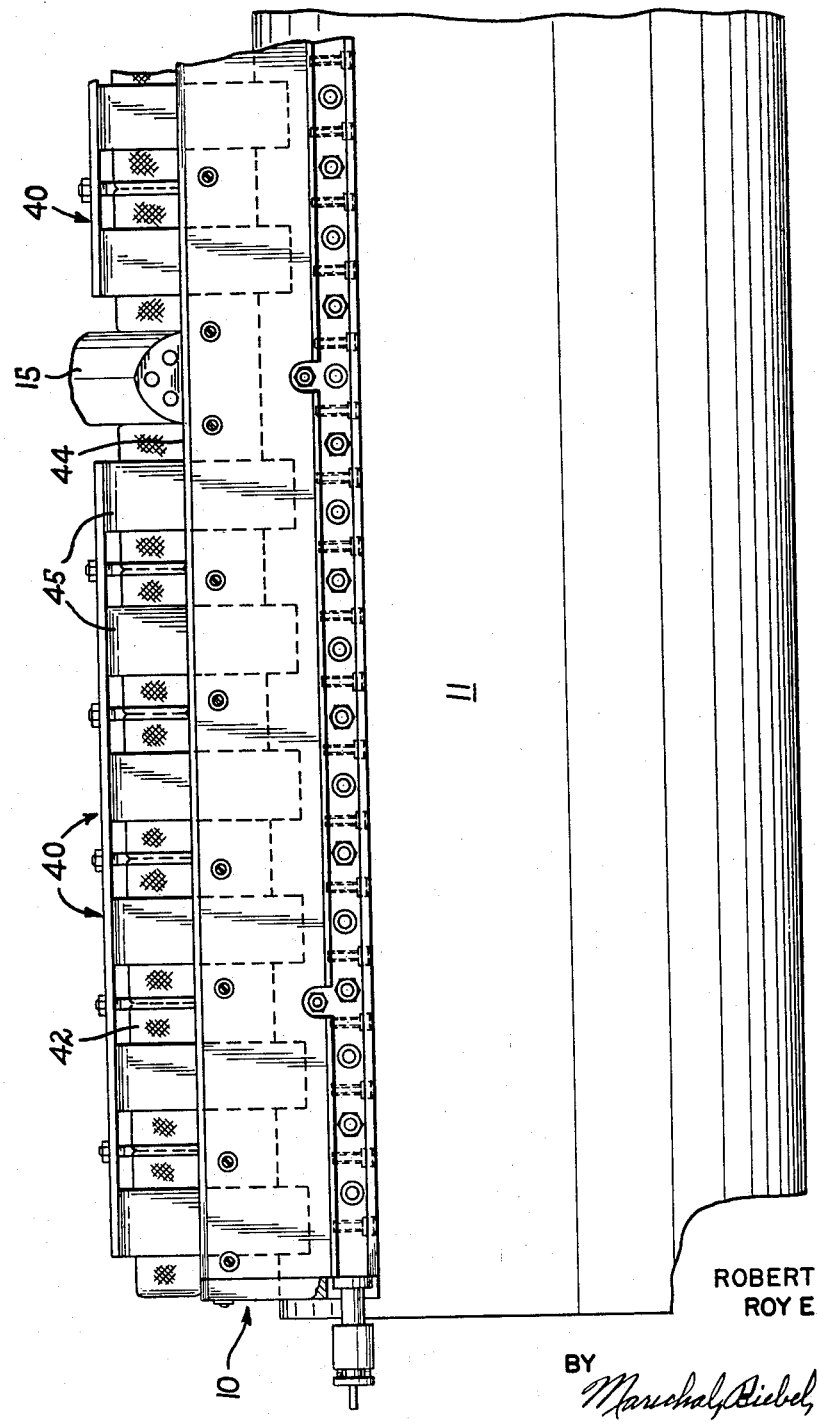

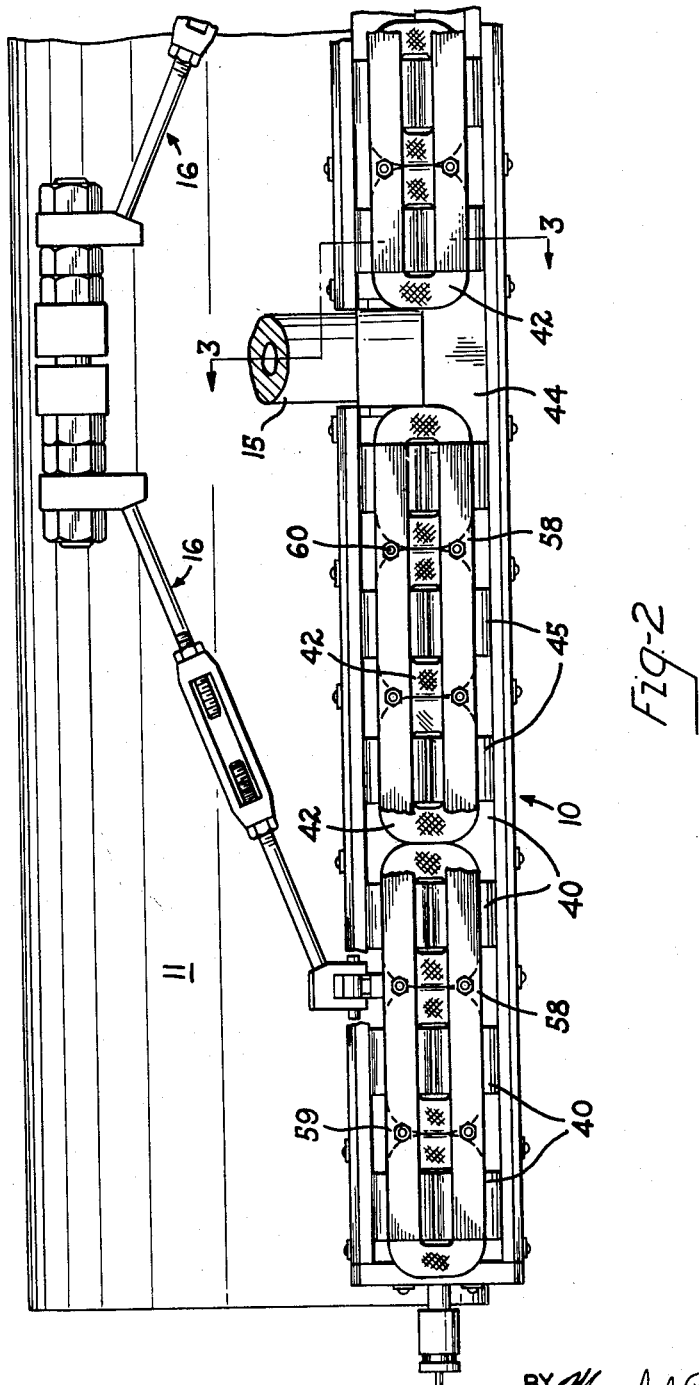

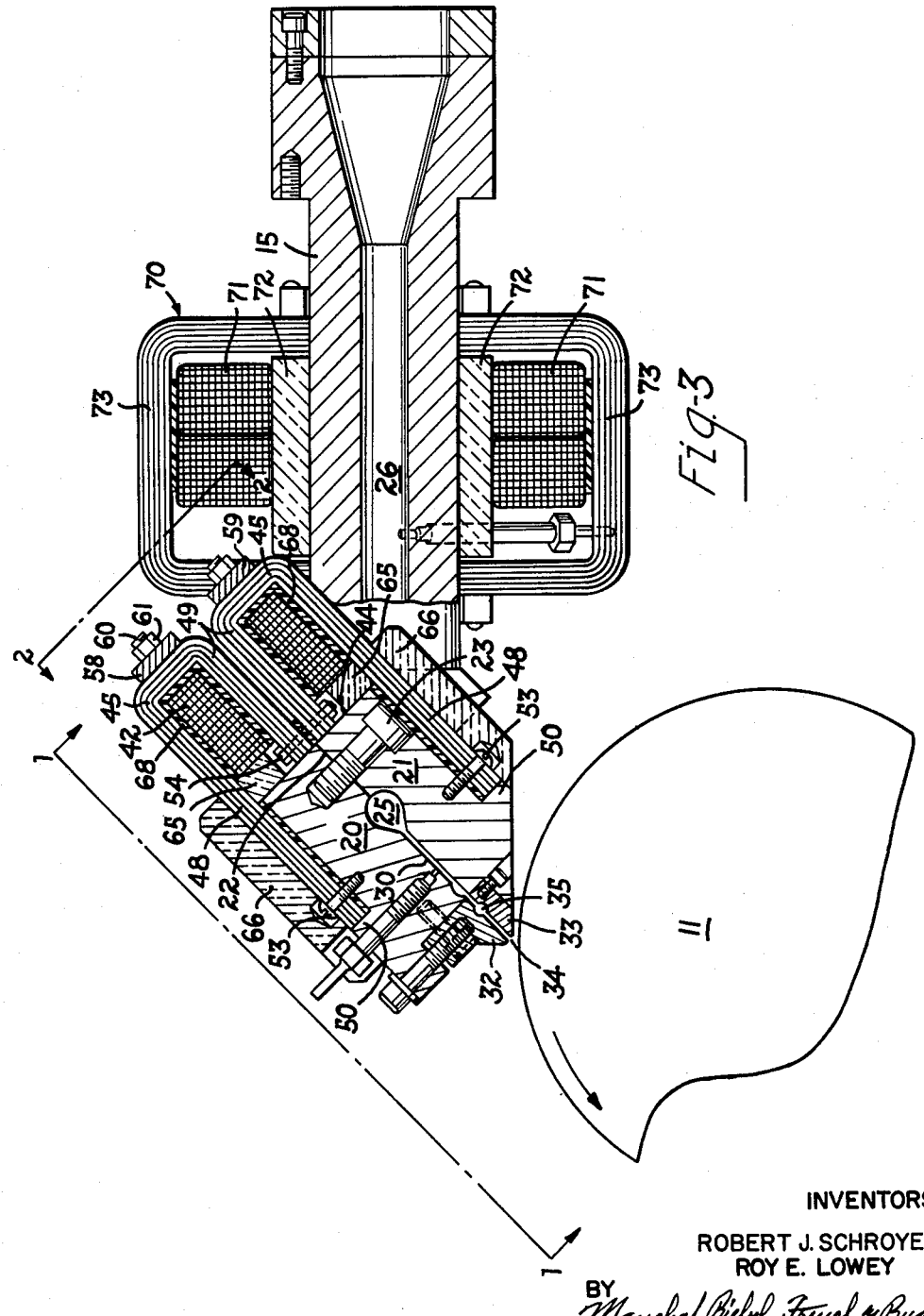

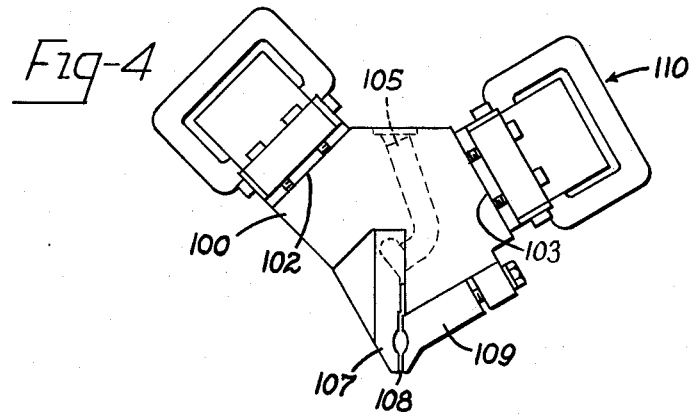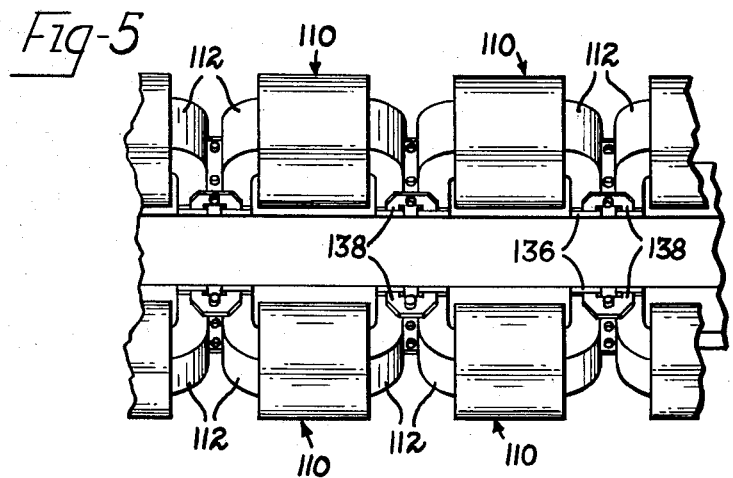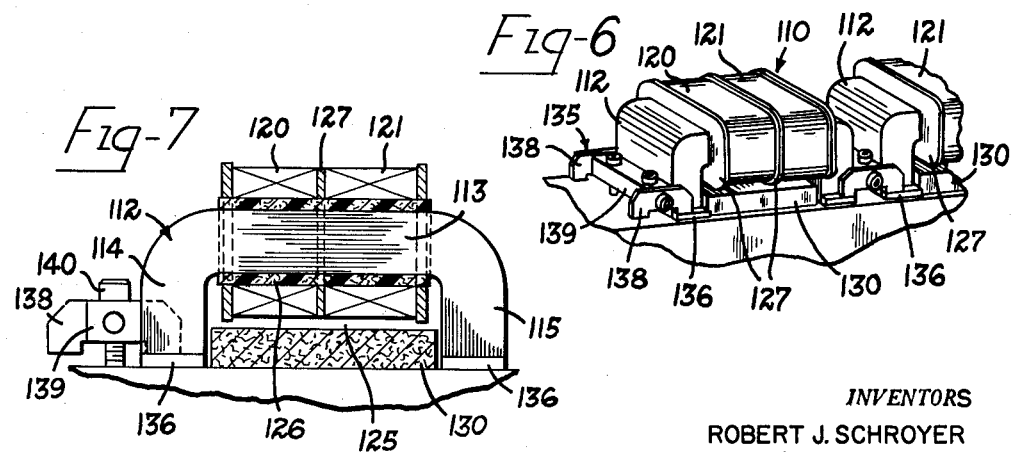

3,179,778
EXTRUSION MACHINES
Robert J. Schroyer and Roy E. Lowey, Cuyahoga Falls, Ohio, assignors, by mesne assignments, to The Black-Clawson Company, New York, N.Y., a corporation of Delaware
Filed July 26, 1961, Ser. No. 127,052
4 Claims. (Cl. 219—10.49)

This invention relates to extended film dies for extruders and more particularly to such dies combined with induction heating. This application is a continuation-in-part of the application of Schroyer et al. S.N. 848,301, filed October 23, 1959, now abandoned.

Induction heating has been applied to extruder barrels, nozzles, plasticizing cylinders and the like where it is possible and convenient to place the induction heating coil in surrounding relation to the ferrous body or object to be heated. In such known arrangements, the electric coil becomes the principal flux inducing agent while flux guides may be employed in surmounting relation over a portion of the coil to provide a low impedance return path for the flux in order to improve efficiency.

In certain plastic extruder die configurations, such as flat film and circular film dies, it is impractical to surround the part which is to be heated by the turns of a coil for the purpose of inducing flux therein. In this invention, the flux-inducing electric coil is placed adjacent the die body to be heated, and a flux guide is extended through the coil and into contact with the body for the purpose of directing the flux from the coil into the body. The amount of flux which is induced by the coil directly into the body is, in this invention, small compared to the amount of flux directed by the flux guides. Preferably, a plurality of individual coils are employed adjacent the die body with a plurality of flux guides having legs terminating in contact with the body resulting in an arrangement whereby an elongated die member may be heated and maintained at a uniform extrusion temperature along its length.

The invention includes effective isolation of the electric coil from the body being heated to protect the coil against excessively high temperatures. Therefore, the invention is capable of creating a heat within the die body which is considerably in excess of the maximum heat which the electric coil can withstand without destruction or damage. Furthermore, the coil is preferably isolated from direct contact with the flux guides since the guides, themselves, may operate at a temperature which may burn or damage the resins of the electric coil.

The preferred embodiments of this invention are in relation to flat film dies which are used in the production of flat plastic films either as a coating or as a self-supporting film. It is desirable that the die heads for extending film dies be capable of yielding a jell-free film at linear speeds in the order of 1,000 ft. per minute or more with film thickness which may vary between 0.25 and 5 mils. It is also desirable that the thickness and rate be maintained uniformly across the width of the web, and this can be achieved only where an accurately controlled temperature is maintained within the die body. Extrusion temperatures may run above 600° F., and extruding temperatures are constantly being increased concomitantly with the development of new synthetics and plastics. The heating units of this invention successfully meet these requirements.

A principal object of this invention is the provision of a flat film die incorporating electric induction heating as outlined above.

A further object of this invention is the provision of an induction heating unit particularly adapted for use with a plurality of similar units on extended film dies.

Another object of this invention is to provide an extended film die which includes induction heating units wherein the electric coils thereof are positioned adjacent the die surface and flux guides are extended therethrough to apply the heating flux, as desired, into the body of the die.

Another object of this invention is the provision of an extended die unit employing induction heating coils with external electric coils which are effectively isolated from the heat of the die body and of the flux guide for protection against damage due to heat generated within the body of the die.

Other objects and advantages of the invention will be apparent from the following description, the accompanying drawings and the appended claims.

In the drawings—

FIG. 1 is a front view of an extended die constructed according to this invention as viewed from an angle of approximately 45° above the horizontal substantially as indicated by the line 1—1 of FIG. 3, and also showing a portion of a chill roll;

FIG. 2 is a view of the die of FIG. 1 showing the details of the top thereof as viewed generally along the line 2—2 of FIG. 3;

FIG. 3 is a section through the die head and through a portion of the central feed conduit taken generally along the line 3—3 of FIG. 2;

FIG. 4 is an end view with the end plate removed of a modified die and heating arrangement therefor constructed according to this invention;

FIG. 5 is a fragmentary plan view of the die of FIG. 4 showing the arrangement of the two parallel sets of induction heating units;

FIG. 6 is a perspective view of one of the induction heating units of FIG. 5; and FIG. 7 is a transverse section through the induction heating unit of FIG. 6.

Referring to the drawings, which illustrate preferred embodiments of the invention, an elongated die head for extruding a flat self-supporting film is indicated generally at 10 in FIGS. 1 and 2 as being supported immediately above a chill roll 11 for extrusion onto the surface thereof. The die head 10 may also be used for extruding a coating onto the surface of a moving web of material, such as foil or paper, and it may be employed to operate between the nip of a pair of adjacent rolls. The die head 10 is preferably formed and supported on the extended end of a feed conduit 15, although a stabilizing and adjustable supporting structure indicated generally at 16 may also be employed to hold the die head in a desired relation to the roll 11.

Referring to FIG. 3, the die head 10 is formed with an extruding body which includes an outer die part 20 and an inner die part 21 which parts are formed of ferrous metal and are joined together at a parting plane 22 by a series of bolts 23. The die parts 20 and 21 form cooperating portions of a main transverse die cavity 25. The cavity 25 extends along the length of the die and communicates with a feed passageway 26 formed within the inlet conduit 15.

The die parts 20 and 21 also form a narrow slot 30 which communicates with the cavity 25 and which is formed by relieving the parts 20 and 21 at the adjacent surfaces thereof. Adjustable extrusion nozzle means comprise a pair of oppositely disposed metal lips 32 and 33 which are preferably detachably and adjustable mounted respectively on the die parts 20 and 21. The nozzle lips define an extrusion orifice 34 therebetween which communicates with the cavity 25 by means of the slot 30. The lips 32 and 33 may each be provided with a groove to form the opposite halves of a deckle rod passageway 35 for the reception of a deckle rod to limit the width of extrusion therefor. A suitable such deckle rod is shown in the above Schroyer et al application.

Means for heating the die head including the die parts 20 and 21 to hold the contents of the cavity 25 and of the passageway 30 and orifice 34 at a desired elevated extruding temperature include a plurality of induction heating units indicated generally at 40 in FIGS. 1 and 2. In this embodiment, each of the units 40 includes a flat wound electric heating coil 42 which is positioned along the side of a flat and preferably machined surface of the die body. In this embodiment, a plurality of coils 42, each having a length substantially less than the overall length of the die, are positioned externally of the die body and adjacent the upper flat surface 44 thereof, as shown in FIGS. 2 and 3.

Each of the induction heating units 40 include a pair of similar U-shaped flux guides 45 which are formed of highly grain-oriented silicone steel laminae. Each of the flux guides, which are employed in pairs, has a long leg 48 and a short leg 49 in surmounting relation to a portion of the coil 42, the ends of which are brought down into intimate contact with the die body. In this embodiment, the inner short legs 49 are placed adjacent each other in contact with the surface 44 of the parts 20 and 21 adjacent the parting plane 22, and the elongated legs 48 are extended down adjacent the front and back sides of the parts 20 and 21 and into contact with a ledge portion 50 thereof.

The flux guides 45 thus form a cavity between the inner surface of the guide and the adjacent surface of the die body within which the turns of the induction coils are received. In other words, the flux guides are positioned over the coil with the inner or short legs 49 thereof extending through the central opening formed by the coil 42 and the long legs extending adjacent the outer surface of the coil. In this manner, the heat inducing flux generated by the coil 42 of each unit 40 is directed by the flux guides into the material of the die parts 20 and 21 which parts form a return path from the end of one extended leg to the end of the other whereby heating is effected within the die parts due to eddy currents and hysteresis losses.

The long legs of the flux guides are held and secured by screws 53 while the short legs thereof may be connected together by bolts 54. The guides themselves are preferably held down against the die body in intimate contact therewith by overlying longitudinally extending metal straps 58 and 59. The straps are supported by stud bolts 60 (FIGS. 1 and 2) which extend through suitable openings formed in the tie rod and are held down by nuts 61 threaded thereon.

The electric coils 42 are preferably positioned adjacent the inner and upper surfaces of the flux guides to define a space between the bottom of the coil and the adjacent surface of the body being heated. Preferably, a portion or all of such space may be occupied by insulating means which may consist of pads 65 of insulation positioned adjacent the surface 44 of the die for isolating the coil 42 from excessively high temperatures formed within the body of the die. In the embodiment shown in FIGS. 1–3, the insulating pads 65 are proportioned to occupy substantially the total space between the lower surface of the electric coil 42 and the adjacent surface 44 of the die parts. Also, in this embodiment additional pads of insulation 66 may be provided at the sides of the die for the purpose of retaining heat therein.

It is preferably desirable to isolate the electric coils from direct contact with the material of the flux guides, and such isolation may take the form of several turns or layers of glass tape 68 which may form an overwrap for the coils. This tape not only provides effective electrical insulation, which is required, but is preferably proportioned of sufficient thickness so as to prevent direct heat transfer from the flux guides to the coils and thus prevents the burning of the coil resins.

The feed conduit 15 is also preferably inductively heated for the purpose of maintaining the desired temperature within the passageway 26, and for this purpose the conduit may be provided with an induction heating unit indicated generally at 70 in FIG. 3. This heating unit 70 may be constructed according to the teachings of the copending application of Kullgren et al., Serial No. 110,-502, filed May 16, 1961, and assigned to the same assignee as this application. Thus the heating unit 70 may include a coil 71 positioned in surrounding relation to the conduit 15 and spaced therefrom by an annular pad of insulation material 72. A plurality of generally U-shaped flux guides 73 may be disposed in surmounting relation about the coil 71 and angularly disposed from each other with inner ends held in contact with the conduit 15.

A modified form of the invention is shown in FIGS. 4–7 wherein a substantially solid die body 100 is formed with a pair of planar surfaces 102 and 103. As shown in FIG. 4, the body 100 includes a central feed passage 105 which supplies plastic material for extrusion to a recess 106 formed in a fixed die lip 107. The lip 107 forms an extrusion orifice 108 with an adjustable die lip 109.

A plurality of induction heating units 110 are arranged in longitudinally extending relation on each of the surfaces 102 and 103 thereby forming two parallel rows of heating units. Each of the heating units 110 is substantially identical to the other, one of these units being shown in section in FIG. 7. The units 110 each include a generally U-shaped laminated flux guide 112 with a longitudinally extending body 113 and depending legs 114 and 115, the legs preferably being of equal length.

Electric heating coil means for the units 110 consisting of a pair of heating coils 120 and 121 are formed about and supported on the body 113 of each of the flux guides 112. The coils 120 and 121 define a space 125 between the lower surface thereof and the adjacent surface 102 or 103 of the die 100. In this embodiment, the coils 120 and 121 have all of their turns wrapped as a torus about the body 113 of the flux guide on a phenolic insulating form 126 and are separated by insulating spacers 127. The form 126 provides the insulating means which prevents direct contact of the coils with the body of the flux guides. The coils may be connected either in series or in parallel, depending on the voltage, and are preferably operated on 60 cycle A.C. power.

Means for insulating the coils from excessively high temperatures includes the space 125 and a pad 130 of insulating material, one each of such pairs being provided for each of the units 110 as indicated in FIG. 6. The flux guides 112 of the units 110 are held in intimate contact with the surfaces 102 and 103 by hold-down yokes 135. The legs may have short blocks 136 welded on the sides thereof which are contacted by the foot plates 138 of the yokes 135. The plates 138 are connected to each other by a bar 139 and the bar is, in turn, biased downwardly toward the die by cap screws 140.

This invention therefore provides combined extended film dies and heating units therefor which are characterized by simplicity in construction and which have electric coils positioned adjacent the portion of the surface to be heated. The flux guides perform the function of directing the heating flux, as desired, along the longitudinal extent of the die body resulting in an efficient heating arrangement for holding sustained high temperatures within the body of the die.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:
1. An extended flat film die comprising an elongated die body, means in said die body defining a longitudinal cavity and an extrusion orifice extending from said cavity substantially along the length of said body for forming a film of plastic material, heating means for holding the plastic contents of said cavity and said orifice at a desired extruding temperature including a generally U-shaped flux guide having a longitudinally extending body portion terminating in inwardly turned legs, means fastening said legs at the ends thereof in intimate contact with said die body, an electric and heat insulating coil form carried directly on said body portion of said flux guide and having means for supporting a pair of heating coils in longitudinally spaced relation thereon, and a pair of induction heating coils having a plurality of turns wound as a torus directly onto said form in longitudinally spaced relation and in spaced relation to the adjacent surface of said die body for effecting the injection of flux into said die body substantially wholly through said flux guide for heating said die body.

2. An extended flat film die comprising an elongated die body, means in said die body defining a longitudinal cavity and an extrusion orifice extending from said cavity substantially along the length of said body for forming a film of plastic material, heating means for holding the plastic contents of said cavity and said orifice at a desired extruding temperature including a plurality of generally U-shaped flux guides arranged generally in a row longitudinally of said die body and each having a longitudinally extending body portion terminating in inwardly turned legs, clamp means common to adjacent pairs of said guides fastening said legs at the ends thereof in intimate contact with said die body, an electric and heat insulating coil form carried directly on said body portion of each said flux guide, an induction heating coil for each said form having a plurality of turns wound as a torus directly onto said form in spaced relation to the adjacent surface of said die body for effecting the injection of flux into said die body substantially wholly through said flux guide for heating said die body, and a pad of insulation secured to said die body beneath each said coil and proportioned to define an open air space with the associated said coil to retain heat in said body and to isolate said coil from excessive heat radiated from said body.

3. An extended flat film die comprising an elongated die body, means in said die body defining a longitudinal cavity and an extrusion orifice extending from said cavity substantially along the length of said body for forming a film of plastic material, heating means for holding the plastic contents of said cavity and said orifice at a desired extruding temperature including a generally U-shaped flux guide having a longitudinally extending body portion terminating in inwardly turned legs, means fastening said legs at the ends thereof in intimate contact with said die body, an electric and heat insulating coil form carried directly on said body portion having a circumferential insulating spacer formed intermediate the ends thereof, and a pair of induction heating coils each having a plurality of turns wound as a torus directly onto said form with said coils being separated by said spacer and having outer surfaces in spaced relation to the adjacent surface of said die body for effecting the injection of flux into said die body substantially wholly through said flux guide for heating said die body and providing selection between high or low voltage operation.

4. The die of claim 3 further having means forming a pad of insulation received adjacent said die body in the space between said flux guide legs and defining with said coil an open air space therebetween isolating said coil from the effects of excessive heating from said body.

References Cited by the Examiner
UNITED STATES PATENTS

| | | | |
|---|---|---|---|
| 1,365,199 | 1/21 | Sessions | 219—8.5 |
| 2,226,448 | 12/40 | Smith | 219—10.73 X |
| 2,430,285 | 11/47 | Ferris | 219—10.49 |
| 2,832,876 | 4/58 | Mucha | 219—10.79 X |
| 2,902,572 | 9/59 | Lackner et al. | 219—10.79 X |
| 2,929,906 | 3/60 | Connelly | 219—10.79 |
| 2,982,995 | 5/61 | Groleau | 18—12 |
| 3,123,699 | 3/64 | Stephenson et al. | 219—10.49 |

RICHARD M. WOOD, *Primary Examiner.*

MAX L. LEVY, ANTHONY BARTIS, *Examiners.*

UNITED STATES PATENT OFFICE
CERTIFICATE OF CORRECTION

Patent No. 3,179,778                                            April 20, 1965

Robert J. Schroyer et al.

It is hereby certified that error appears in the above numbered patent requiring correction and that the said Letters Patent should read as corrected below.

In the grant, lines 2 and 3, for "assignors, by mesne assignments, to The Black-Clawson Company, of New York, N. Y., a corporation of Delaware," read -- assignors, by mesne assignments, to Blaw-Knox Company, a corporation of Delaware, --; line 12, for "The Black-Clawson Company, its successors" read -- Blaw-Knox Company, its successors --; in the heading to the printed specification, lines 4 to 6, for "assignors, by mesne assignments, to The Black-Clawson Company, New York, N. Y., a corporation of Delaware" read -- assignors, by mesne assignments, to Blaw-Knox Company, a corporation of Delaware --; column 4, line 50, for "pairs" read -- pads --.

Signed and sealed this 12th day of October 1965.

(SEAL)
Attest:

ERNEST W. SWIDER
Attesting Officer

EDWARD J. BRENNER
                                               Commissioner of Patents